(12) United States Patent
Jeddeloh

(10) Patent No.: US 6,260,121 B1
(45) Date of Patent: *Jul. 10, 2001

(54) METHOD FOR ADAPTIVE DECODING OF MEMORY ADDRESSES

(75) Inventor: Joseph M. Jeddeloh, Minneapolis, MN (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/106,967

(22) Filed: Jun. 30, 1998

(51) Int. Cl.[7] ........................................ G06F 12/00
(52) U.S. Cl. .................. 711/154; 711/172; 711/201; 711/210; 712/208
(58) Field of Search ................... 711/210, 201, 711/204, 170, 172, 154; 712/208, 211, 230, 240

(56) References Cited

U.S. PATENT DOCUMENTS

| | | | |
|---|---|---|---|
| 4,985,871 | * | 1/1991 | Catlin ............................. 365/230.06 |
| 5,386,531 | * | 1/1995 | Blaner et al. ....................... 711/201 |
| 5,555,387 | * | 9/1996 | Branstad et al. .................... 711/209 |
| 5,848,258 | * | 12/1998 | Fenwick et al. ...................... 711/5 |
| 5,860,106 | * | 1/1999 | Domen et al. ....................... 713/324 |
| 5,935,241 | * | 8/1999 | Shiell et al. ....................... 712/240 |

\* cited by examiner

*Primary Examiner*—Matthew Kim
*Assistant Examiner*—Matthew D. Anderson
(74) *Attorney, Agent, or Firm*—Park, Vaughan, Fleming LLP

(57) ABSTRACT

One embodiment of the present invention provides a method for accessing a computer memory that bypasses decoding delays for memory type information within a memory controller. This method operates by receiving a current address, which specifies a location in the computer memory, and determining whether the current address falls within a previously accessed memory module. If so, the method receives characteristics of the previously accessed memory module from a prior decoding of a previous address to the previously accessed memory module. These characteristics may include information on size, type and speed of the modules in the computer memory. The method uses these characteristics to generate a memory access to the current address. In a variation on this embodiment, if the current address does not fall within the previously accessed memory module, the method decodes the current address to look up characteristics of a current memory module for the current address. Another variation includes identifying the current memory module being accessed by the current address, and storing information regarding upper and lower address boundaries for the current memory module. This information is used to determine if a subsequent memory access is directed to the current memory module.

15 Claims, 3 Drawing Sheets

METHOD FOR ADAPTIVE DECODING OF MEMORY ADDRESSES

RELATED APPLICATION

The subject matter of this application is related to the subject matter in the U.S. patent application Ser. No. 09/107,782, filed Jun. 30, 1998, pending.

BACKGROUND

1. Field of the Invention

The present invention relates to the design of a memory access structure in a computer system. More particularly, the present invention relates to a memory access structure, which provides fast decoding of memory type information for memory references that fall within a previously accessed module of memory.

2. Related Art

As processors clock speeds continue to increase, memory systems are under increasing pressure to provide data at faster rates to keep pace with the faster processors. This has recently led to the development of new memory chip designs, including page mode and extended data out (EDO) architectures, which achieve a high burst rate and low latencies within a single page of memory. Another recent innovation is to incorporate a synchronous clocked interface into a memory chip, thereby allowing data from within the same page of memory to be clocked out of the memory in a continuous stream using the processor clock. Such memory chips, with clocked interfaces are known as synchronous random access memories.

These new, faster memory chip designs are placing increasing pressure on associated memory controller circuitry to keep pace with the faster memory chips. In particular, memory controllers often include a decode block that must be accessed in a fraction of a memory cycle to retrieve characteristics of a memory module that is presently being accessed. These characteristics may include attributes such as memory speed, memory type and memory size, and are used by the memory controller to generate control signals for the requested memory access. With the faster memory cycle times, it is becoming increasingly harder to access the decode block in the required fraction of a memory cycle. Furthermore, as the number of varieties, sizes and access times supported by a memory controller increases, the amount of time required to decode the memory characteristics also increases.

What is needed is a system that generates characteristics of a memory module being accessed without a significant decoding delay.

SUMMARY

One embodiment of the present invention provides a method for accessing a computer memory that bypasses decoding delays for memory type information within a memory controller. This method operates by receiving a current address, which specifies a location in the computer memory, and determining whether the current address falls within a previously accessed memory module. If so, the method receives characteristics of the previously accessed memory module from a prior decoding of a previous address to the previously accessed memory module. These characteristics may include information on size, type and speed of the modules in the computer memory. The method uses these characteristics to generate a memory access to the current address.

In a variation on this embodiment, if the current address does not fall within the previously accessed memory module, the method decodes the current address to look up characteristics of a current memory module for the current address.

Another variation includes identifying the current memory module being accessed by the current address, and storing information regarding upper and lower address boundaries for the current memory module. This information is used to determine if a subsequent memory access is directed to the current memory module.

In another variation, the method determines, upon system startup, characteristics for modules in the computer memory, and stores these characteristics to facilitate subsequent accesses to the modules.

In yet another variation, the act of using the characteristics to generate the memory access includes generating a module select signal.

In a further variation, the act of using the characteristics to generate the memory access includes generating control signals to selectively align upper and lower portions of the current address for input into a current memory module.

SUMMARY (APPARATUS VERSION)

One embodiment of the present invention provides an apparatus for accessing a computer memory that bypasses decoding delays for memory type information within a memory controller. This apparatus includes a decoding circuit, for decoding a current address received from a processor to produce characteristics of a current memory module that is being accessed by the current address. These characteristics may include the size, type and speed of modules in the computer memory. The apparatus also includes a control signal generation circuit, for generating signals to control a memory access to the current address based upon the characteristics of the current memory module. The apparatus further includes a comparison module for determining whether the current address falls within a previously accessed memory module. The apparatus additionally includes a bypassing circuit. If the comparison module indicates that the current address falls within the previously accessed memory module, this bypassing circuit causes characteristics of a previously accessed memory module, obtained from a prior decoding of a previous address, to be used to generate the control signals for controlling the memory access. In a variation on this embodiment, if the comparison module indicates that the current address falls outside the previously accessed memory module, the bypassing circuit is causes characteristics of a memory module accessed by the current address to be used to generate the control signals.

In another variation, the comparison module is configured to identify a current memory module that being accessed by the current address, and to store information that can be used to determine upper and lower address boundaries for the current memory module.

Another variation includes a configuration mechanism that determines, upon system startup, characteristics of modules in the computer memory, and that uses these characteristics to configure the memory controller to generate accesses to the modules.

In another variation, the control signal generation circuit produces a module select signal.

In yet another variation, the control signal generation circuit produces control signals to selectively align upper and lower portions of the current address for input into a current memory module.

DEFINITIONS

Memory Module

A portion of a computer system's memory. For example, a memory module may include, but is not limited to, a single memory chip, a bank of memory chips, or a removable board containing memory chips, such a a dual in-line memory module (DIMM) or a single in-line memory module (SIMM).

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of Computer System

Figure 1:
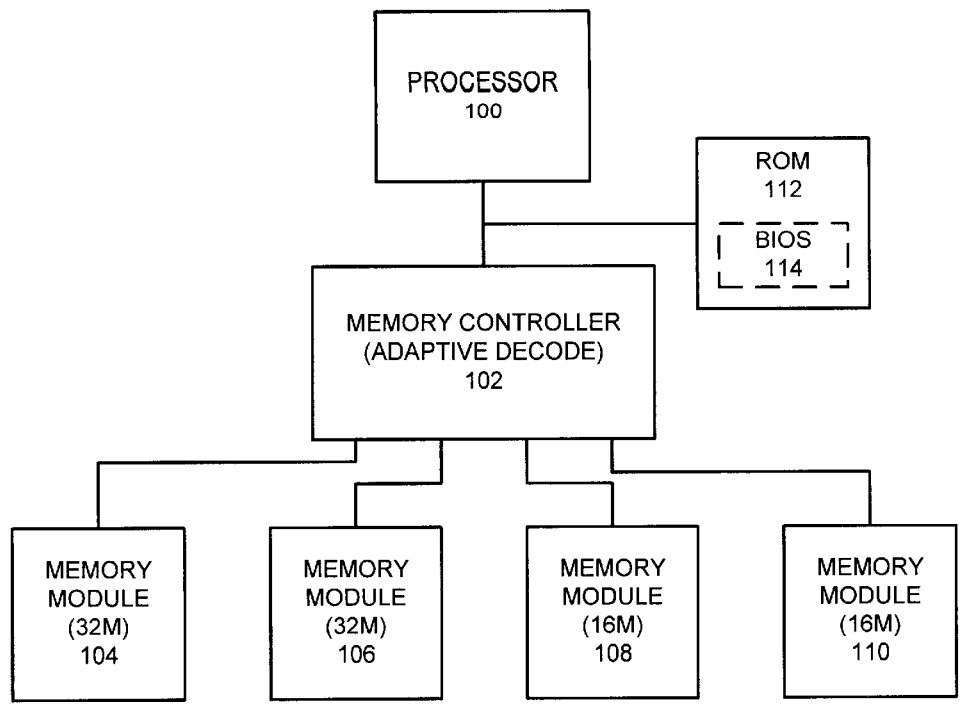
FIG. 1 illustrates a computer system, including processor 100 and memory controller 102 with adaptive decoding in accordance with an embodiment of the present invention.

FIG. 1 illustrates a computer system, including a processor 100 and a memory controller 102 with adaptive decoding in accordance with an embodiment of the present invention. Processor 100 may include any general or special purpose processor, including, but not limited to microprocessors, mainframe computers, digital signal processors, graphics processors and device controllers.

Processor 100 is coupled to memory controller 102, which is coupled to memory modules 104, 106, 108 and 110. Memory controller 102 receives memory accesses from processor 100 and converts these accesses into signals to perform these accesses on memory modules 102, 106, 108 and 110. Memory controller 102 additionally includes an adaptive decode feature that enables an access to a previously accessed memory module to use a prior decoding of memory type information to generate control signals for the memory access. This can eliminate the need for a time-consuming decoding operation. This adaptive decoding feature is described below with reference to FIGS. 2, 3, and 4.

Memory modules 104, 106, 108 and 110 may include any portion of a computer system's memory that can be separated from the rest of the computer system's memory. For example, a memory module may include, but is not limited to, a single memory chip, a bank of memory chips, or a removable board containing memory chips. Memory modules 104, 106, 108 and 110 may also include different types of memory chips, including, but not limited to, page mode, EDO, SyncLink and Rambus memory chips. Memory modules 104, 106, 108 and 110 can vary in size. For example, in the system illustrated in FIG. 1, memory modules 104 and 106 include 32 megabytes of memory, whereas memory modules 108 and 110 include 16 megabytes of memory. This information on memory size, type and speed is stored for each module in memory controller 102 so that it can be looked up with a memory address during subsequent memory accesses.

In the illustrated embodiment, processor 100 is additionally coupled to read only memory (ROM) 112. ROM 112 stores code and data (in non-volatile storage) to implement operating system functions for processor 100. In the illustrated embodiment, this code and data includes BIOS 114, which, among other things, initializes the operation of processor 100 when processor 100 is booted up. In an alternative embodiment, processor 100 is coupled to ROM 112 through memory controller 102.

In one embodiment of the present invention, ROM 112 includes code to configure memory controller 102. Upon system boot up, this code determines characteristics of memory modules 104, 106, 108 and 110, including memory module size, type and speed. This information is stored in memory controller 102 to facilitate generating control signals for accesses to memory modules 104, 106, 108 and 110.

Figure 2:
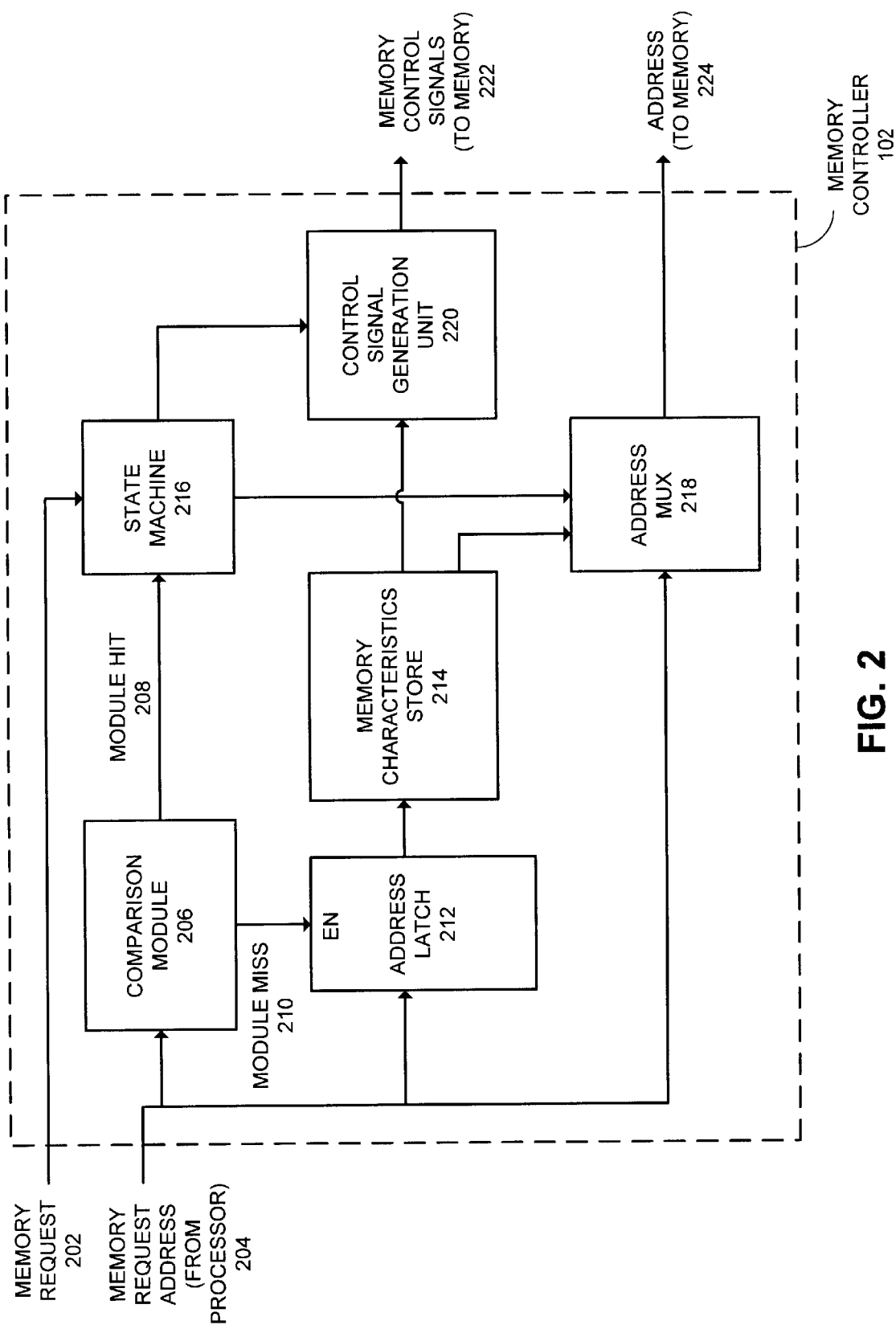
FIG. 2 illustrates part of the internal structure of memory controller 102 from FIG. 1 in accordance with an embodiment of the present invention.

Not shown in FIG. 2 are possible interconnection schemes between the illustrated system components. In one embodiment, memory controller 102 is coupled to memory modules 104, 106, 108 and 110 through a bus, instead of through the illustrated direct connections. In another embodiment, processor 100 is coupled to memory controller 102 and ROM 112 through a bus.

Description of Memory Controller

FIG. 2 illustrates part of the internal structure of memory controller 102 from FIG. 1 in accordance with an embodiment of the present invention. Memory controller 102 receives memory request signal 202 and memory request address 204 from processor 100. Memory request signal 202 feeds into state machine 216. Memory request address 204 feeds into comparison module 206, address latch 212 and address multiplexer (MUX) 218.

Comparison module 206 generates module hit signal 208, which indicates that memory request address 204 falls within a previously addressed memory module. Module hit signal 208 feeds into state machine 216, which also receives an input from memory request signal 202, and produces an output which feeds into control signal generation unit 220.

Comparison module 206 also generates module miss signal 210, which indicates that memory request address 204 does not fall with the previously accessed memory module. Module miss signal 210 feeds into an enable input of address latch 212.

Address latch 212 receives an input from memory request address, and produces an output which feeds into memory characteristics store 214. Memory characteristics store 214 decodes the output from address latch 212 to produce characteristics for a memory module that contains the address stored in address latch 212. These characteristics feed into address MUX 218 and control signal generation unit 220. Control signal generation circuit produces memory control signals 222, which controls accesses to memory modules 104, 106, 108 and 110. Address MUX 218, generates address signals 224 for input into one of memory modules 104, 106, 108 and 110.

Description of Comparison Module

Figure 3:
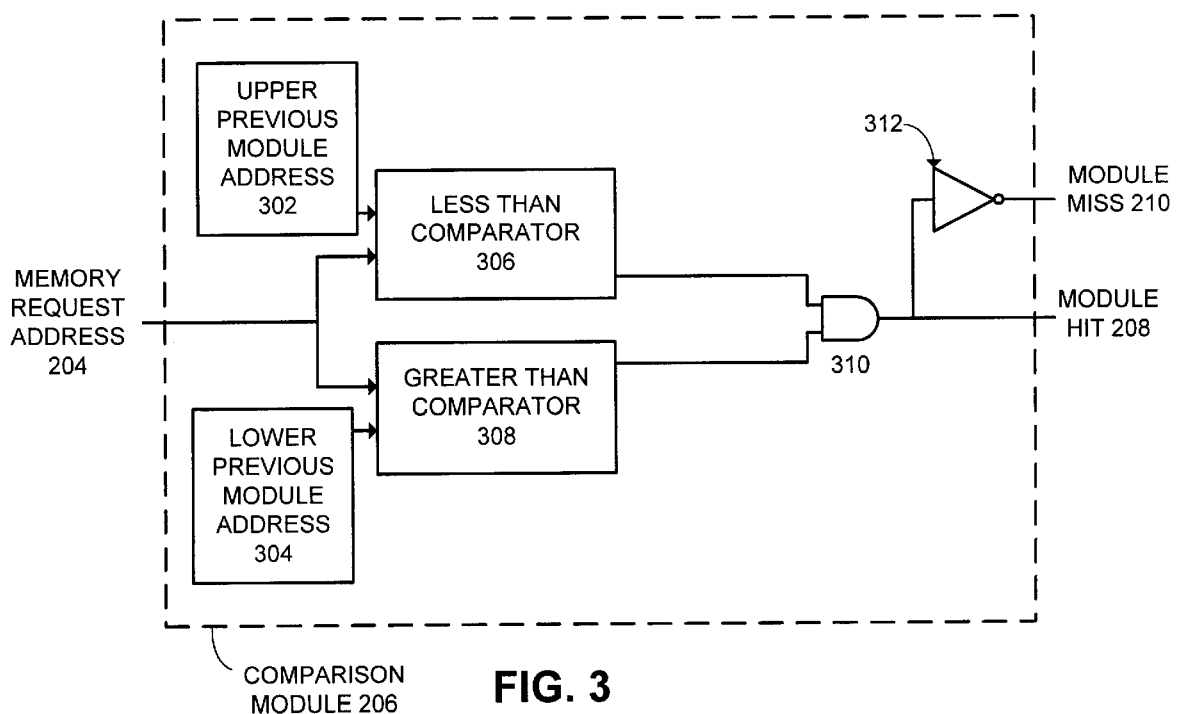
FIG. 3 illustrates part of the internal structure of comparison module 206 from FIG. 2 in accordance with an embodiment of the present invention.

FIG. 3 illustrates part of the internal structure of comparison module 206 from FIG. 2 in accordance with an embodiment of the present invention. Comparison module 206 takes in memory request address 204. Memory request address 204 is compared against upper previous module address 302, in less than comparator 306, and is compared against lower previous module address 304, in greater than comparator 308. The outputs of less than comparator 306 and greater than comparator 308 feed into AND gate 310, which generates module hit signal 208. This signal indicates that memory request address 204 falls within a previously accessed memory module. Module hit signal 208 additionally feeds through inverter 312 to produce module miss signal 210.

Description of Memory Decoding

Figure 4:
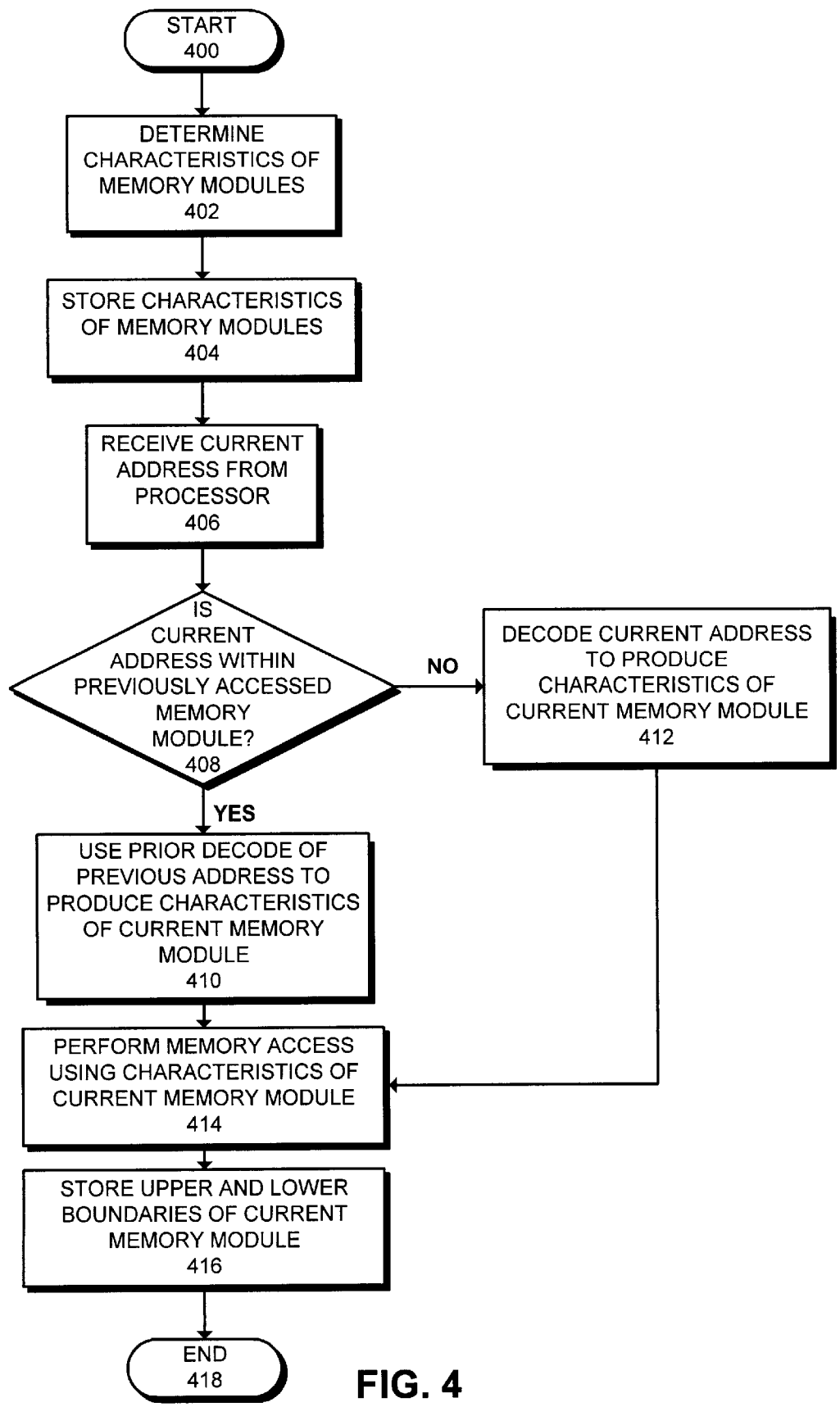
FIG. 4 is a flow chart illustrating some of the operations involved decoding a memory address in accordance with an embodiment of the present invention.

FIG. 4 is a flow chart illustrating some of the operations involved decoding a memory address in accordance with an embodiment of the present invention. The system starts at state 400 and proceeds to state 402. In state 402, the system determines the characteristics of memory modules in the system. In one embodiment, this task is performed by BIOS 114 within ROM 112 during system boot up. In this embodiment, upon boot up, BIOS 114 executes commands to determine the type, speed and size for each memory module in the system. Memory type information may specify, for example, whether the memory is page mode, EDO, SyncLink and Rambus memory. Memory speed information may specify, for example, whether the memory has a 15 nanosecond or a 10 nanosecond access time. Memory size information may specify that the memory module includes 16 megabyte or 64 megabyte memory chips, for example. The system next proceeds to state 404. In state 404, the system stores this memory characteristic information within memory characteristics store 214 in FIG. 2 for future lookups during subsequent memory accesses. The system next proceeds to state 406.

In state 406, the memory controller receives a current address from processor 100 as part of either a read request or a write request. This current address feeds into memory controller 102 as memory request address 204. The system next proceeds to state 408.

In state 408, the system determines whether the current address is within the previously accessed memory module. This takes place within comparison module 206. In comparison module 206, the current address is compared against upper previous module address 302 and lower previous module address 304, which specify upper and lower address boundaries, respectively, for the previously accessed memory module.

If the current address is not within the previously accessed memory module, the system proceeds to state 412. In state 412, the system decodes the current address to produce characteristics of the current memory module. For example, in FIG. 2, comparison module 206 asserts module miss signal 210, which causes the current address to be latched into address latch 212. This current address feeds into memory characteristics store 214, which uses the current address to look up characteristics of the current memory module. Module hit signal 208, which assumes a non-asserted state, feeds into state machine 216, causing state machine 216 to add an additional clock cycle to the memory request in order to perform the decode operation in memory characteristics store 214. The system next proceeds to state 414.

If the current address is within the previously accessed memory module, the system proceeds to state 410. In state 410, the system uses a prior decode of a previous address to produce characteristics of the current memory module. Since module miss signal 210 is not asserted, address latch 212 continues to contain a prior address, which has been decoded and is presently producing a decoded signal from memory characteristics store 214. The system next proceeds to state 414.

In state 414, the system performs the memory access using the characteristics of the current memory module. These characteristics feed into control signal generation unit 220 and address MUX 218. Control signal generation unit 220 produces control signals for controlling the memory operation to the memory module. For example, these control signals may include row and column strobes as well as various chip select or module select signals. Address MUX 218 uses these memory characteristic signals, as well as signals from state machine 216, to align and sequence parts of the current address for input into the memory modules. For example, memory modules often receive higher order and lower order address bits through the same input lines at different times during a memory access. Address MUX 218 handles the aligning and sequencing of these separate portions of the current address. The system next proceeds to state 416.

In state 416, the system stores upper and lower boundaries of the currently accessed memory module in registers 302 and 304, respectively. This allows the system to determine if a subsequent address fall within the current memory module. The system next proceeds to state 418, which is an end state. The above-outlined process is then repeated as necessary from state 406 to state 418 for subsequent memory references.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. A method for accessing a computer memory, the computer memory being made up of a plurality of hardware memory modules, the method comprising:

receiving a current address, the current address specifying a location in the computer memory, wherein the current address specifies the location of either an instruction reference or a data reference;

determining from the current address which hardware memory module the address corresponds to within the computer memory;

if the current address falls within a previously accessed hardware memory module, receiving physical characteristics of the previously accessed hardware memory module, the physical characteristics having been previously determined during a prior decoding of a previous address within the previously accessed hardware memory module;

wherein the physical characteristics include a size of the current memory module;

using the physical characteristics, including the size of the current memory module, to generate control signals for the computer memory;

wherein the control signals include a chip select signal for enabling at least one memory chip, and row and column strobes to select a location within a memory chip; and sending the control signals to the computer memory in order to perform a memory access to the current address.

2. The method of claim 1, further comprising if the current address does not fall within the previously accessed hardware memory module, determining physical characteristics of a current hardware memory module for the current address.

3. The method of claim 2, further comprising:
identifying the current hardware memory module that is being accessed by the current address; and
storing information regarding upper and lower address boundaries for the current hardware memory module.

4. The method of claim 1, further comprising determining, upon system startup, physical characteristics for the plurality of hardware memory modules in the computer memory, and storing these physical characteristics so that the physical characteristics can be later retrieved to facilitate subsequent accesses to the plurality of hardware memory modules.

5. The method of claim 4, wherein the act of determining the physical characteristics includes determining information on size, type and speed of the plurality of hardware memory modules in the computer memory.

6. The method of claim 1, wherein the act of receiving the physical characteristics includes receiving information about memory module type.

7. The method of claim 1, wherein the act of receiving the physical characteristics includes receiving information about memory module size.

8. The method of claim 1, wherein the act of determining whether the current address falls within the previously accessed hardware memory module includes comparing the current address against upper and lower address boundaries for the previously accessed hardware memory module.

9. The method of claim 1, wherein the act of using the physical characteristics to generate the control signals includes generating control signals to selectively align upper and lower portions of the current address for input into a current hardware memory module.

10. A method for accessing a computer memory, the computer memory being made up of a plurality of hardware memory modules, the method comprising:
determining, upon system startup, physical characteristics for the plurality of hardware memory modules in the computer memory, and storing these physical characteristics to facilitate generation of accesses to the plurality of hardware memory modules in the computer memory;
wherein the physical characteristics include sizes of the plurality of hardware memory module;
receiving a current address, the current address specifying a location in the computer memory, wherein the current address specifies the location of either an instruction reference or a data reference;
determining from the current address which hardware memory module the address corresponds to within the computer memory;
if the current address falls within a previously accessed hardware memory module, receiving physical characteristics of the previously accessed hardware memory module, including the size of the previously accessed hardware memory module, the physical characteristics having been previously determined during a prior decoding of a previous address within the previously accessed hardware memory module;
if the current address does not fall within the previously accessed hardware memory module, determining physical characteristics of a current hardware memory module for the current address;
using the physical characteristics, including a size of the current hardware memory module, to generate control signals for the computer memory;
wherein the control signals include a chip select signal for enabling at least one memory chip, and row and column strobes to select a location within a memory chip;
sending the control signals to the computer memory in order to perform a memory access to the current address;
identifying the current hardware memory module that is being accessed by the current address; and
storing information regarding upper and lower address boundaries for the current hardware memory module for a subsequent memory access.

11. The method of claim 10, wherein the act of receiving the physical characteristics includes receiving information about memory module type.

12. The method of claim 10, wherein the act of receiving the physical characteristics includes receiving information about memory module size.

13. The method of claim 10, wherein the act of determining whether the current address falls within the previously accessed hardware memory module includes comparing the current address against upper and lower address boundaries for the previously accessed hardware memory module.

14. The method of claim 10, wherein the act of using the characteristics to generate the memory access includes generating control signals to selectively align upper and lower portions of the current address for input into the current memory module.

15. The method of claim 10, wherein the act of determining the physical characteristics includes determining information on size, type and speed of the plurality of hardware memory modules in the computer memory.

* * * * *